US008432301B2

(12) United States Patent
Edwards

(10) Patent No.: US 8,432,301 B2
(45) Date of Patent: Apr. 30, 2013

(54) GESTURE-ENABLED KEYBOARD AND ASSOCIATED APPARATUS AND COMPUTER-READABLE STORAGE MEDIUM

(75) Inventor: Cliff Edwards, Delta (CA)

(73) Assignee: McKesson Financial Holdings, Hamilton (BE)

( * ) Notice: Subject to any disclaimer, the term of this patent is extended or adjusted under 35 U.S.C. 154(b) by 294 days.

(21) Appl. No.: 12/853,958

(22) Filed: Aug. 10, 2010

(65) Prior Publication Data
US 2012/0038496 A1   Feb. 16, 2012

(51) Int. Cl.
*H03K 17/94* (2006.01)

(52) U.S. Cl.
USPC ............................. 341/34; 341/22; 345/168

(58) Field of Classification Search ................ 341/34, 341/22; 345/168
See application file for complete search history.

(56) References Cited

U.S. PATENT DOCUMENTS

| 5,231,380 | A | 7/1993 | Logan |
| 5,463,388 | A | 10/1995 | Boie et al. |
| 5,543,588 | A * | 8/1996 | Bisset et al. ............... 178/18.06 |
| 5,675,361 | A | 10/1997 | Santilli |
| 6,025,726 | A | 2/2000 | Gershenfeld et al. |
| 6,204,839 | B1 | 3/2001 | Mato, Jr. |
| 6,677,929 | B2 * | 1/2004 | Gordon et al. ................ 345/156 |
| 7,123,241 | B2 | 10/2006 | Bathiche |
| 7,151,528 | B2 | 12/2006 | Taylor et al. |
| 7,193,613 | B2 | 3/2007 | Jam |
| 2005/0122313 | A1 * | 6/2005 | Ashby ............................ 345/168 |
| 2006/0232557 | A1 | 10/2006 | Fallot-Burghardt |
| 2007/0070052 | A1 | 3/2007 | Westerman et al. |
| 2008/0111710 | A1 * | 5/2008 | Boillot ............................ 341/22 |
| 2009/0251422 | A1 * | 10/2009 | Wu et al. ........................ 345/173 |
| 2009/0295737 | A1 * | 12/2009 | Goldsmith et al. ........... 345/169 |
| 2010/0302153 | A1 * | 12/2010 | Jung et al. ..................... 345/158 |

OTHER PUBLICATIONS

Sensitronics LLC; Force Sensing Resistor (2 pgs.) http://www.sensitronics.com/products/force_sensing_resistor.htm site visited May 11, 2010.
Interlink Electronics; Standard Sensors; Standard FSR Solutions (1 pg.) http://www.interlinkelectronics.com/force_sensors/products/forcesensingresistors/standardsensors.html site visited May 11, 2010.
Paratech Limited; QTC Technology; Pressure-sensing and Switching http://peratech.com/qtctechnology.php site visited May 11, 2010.
Lion Precision Tech Note; Capacitive Sensor Operation and Optimization; LT03-0020; Feb. 2009 (5 pgs.).
Capacitive Proximity Sensors Theory of Operation 3 pgs.

* cited by examiner

*Primary Examiner* — Patricia Nguyen
(74) *Attorney, Agent, or Firm* — Alston & Bird LLP

(57) ABSTRACT

A keyboard is provided that includes an arrangement of keys, circuitry and a first processor configured to generate a signal in response to a keystroke in which a respective key of the arrangement of keys is depressed, and determine how to interpret the keystroke. The keyboard also includes a plurality of proximity sensors and a second processor configured to measure the proximity of an object to the respective proximity sensors, determine a position and/or movement of the object relative to the proximity sensors based on the respective signal, and produce a gesture signal representative of the determined position and/or movement. This gesture signal is interpretable into one or more commands or instructions for directing performance of one or more operations of an apparatus or software operating on the apparatus. A related apparatus and computer-readable storage medium are also provided.

19 Claims, 14 Drawing Sheets

GESTURE-ENABLED KEYBOARD AND ASSOCIATED APPARATUS AND COMPUTER-READABLE STORAGE MEDIUM

FIELD OF THE INVENTION

The present invention generally relates to a user interface and methods for interacting with a computer system, and more particularly, to a gesture-enabled keyboard and associated apparatus and computer-readable storage medium.

BACKGROUND OF THE INVENTION

In the field of medical imaging, prior to the digitization of medical imaging, medical-imaging users (e.g., Radiologists) would analyze physical film printed images in light boxes, and use physical devices such as magnifying glasses, rulers, grease pencils, and their hands to manipulate the physical printed medical images in order to interpret and diagnose the images. With the digitization of medical imaging, the physical film became a digital image, displayable on a computer monitor. A medical-imaging system became a computer application or collection of computer applications, which require a computer or computers to operate. At present, medical-imaging systems are interacted with through a mouse and keyboard. Commands to the medical-imaging system are typically invoked through mouse and/or keyboard interactions.

For image-intensive computing with rich graphical user interfaces, the mouse is showing its age. The mouse constrains the interaction to a single x, y point on the display with buttons to make selections and initiate modes of operation, such as click and drag. Most modern computer mice also have a special purpose scroll mechanism, often a wheel. Much of the human hand and finger capabilities and dexterity are not utilized with a mouse, and a mouse is limited to only one hand. Using the mouse for long periods of time tends to cause fatigue and repetitive stress symptoms due to the need to grasp the device and repeatedly perform small stressing motions of the fingers to position, click and scroll.

For alphanumeric text entry, and initiating commands, keyboards have remained much the same for many decades and it has been difficult to find alternatives that perform better at text entry, for most users. When used as an input device for medical-imaging systems, some form of keyboard may remain in use for text entry for a long time to come.

Another common purpose for which keyboards are used with medical-imaging systems is for shortcut commands to activate discrete operations also available with the mouse but at the cost of pointer navigation time and additional mouse clicking. Most medical imaging professionals who commonly use picture archiving and communication system (PACS) workstations learn a number of these keyboard shortcuts to perform their work faster, and are willing to spend the effort to remember what keys map to what commands. For some interactive operations, shortcuts may also involve mouse modes of operation, often in conjunction with the keyboard. For example, a medical-imaging system zoom-image function could be mapped to the combination of holding down the Ctrl key and moving the mouse forward and back or rolling the scroll wheel. These common interactive operations that involve the mouse are ones that often take the most time to execute and cause the majority of repetitive strain injury (RSI) and fatigue issues.

SUMMARY OF THE INVENTION

The continued presence and usage of a physical keyboard with PACS workstations mean it can be used as a base for augmentation with additional sensors to enable fast interactive operations and without causing any additional clutter or hardware complexity for users. The user can maintain their hand position at the keyboard for longer periods, use the mouse less and perform common interactive operations quickly with low stress and fatigue. Exemplary embodiments of the present invention therefore provide an improved apparatus and method for more intuitively and efficiently interacting with a computer system, such as a medical-imaging system. According to one aspect of exemplary embodiments of the present invention, a keyboard is provided that includes an arrangement of keys, circuitry and a first processor. The circuitry forms a grid of circuits underneath respective keys of the arrangement of keys. In this regard, a circuit of the grid of circuits is configured to generate a signal in response to a keystroke in which a respective key of the arrangement of keys is depressed. The processor, then, is configured to receive the signal from the circuit of the grid of circuits, and compare a location of the respective circuit to a character map to determine how to interpret the keystroke.

The keyboard of this aspect further includes a plurality of proximity sensors and a second processor. The proximity sensors form a grid of sensors underneath the keys; and are configured to measure the proximity of an object (hand or finger(s) of a hand of a user) to the respective proximity sensors, and produce a signal representative of the measured proximity. The second processor, then, is configured to receive the signal representative of the measured proximity, determine a position and/or movement of the object relative to the proximity sensors based on the respective signal, and produce a gesture signal representative of the determined position and/or movement. This gesture signal is interpretable into one or more commands or instructions for directing performance of one or more operations of an apparatus or software operating on the apparatus.

The plurality of proximity sensors may include a first plurality of proximity sensors configured to project respective electric fields through the keys and upward from a top surface of the keyboard. Additionally, the plurality of proximity sensors may also include a second plurality of proximity sensors configured to project respective electric fields outward from sides of the keyboard. The second plurality of proximity sensors may additionally or alternatively include proximity sensors configured to project respective electric fields outward from a back of the keyboard. And even further, the second plurality of proximity sensors may additionally or alternatively include proximity sensors underneath a rest pad extending from a front of the keyboard, where these sensors are configured to project respective electric fields upward and outward from the rest pad.

According to another aspect of exemplary embodiments of the present invention, an apparatus is provided that includes a processor configured to at least perform or cause the apparatus to at least perform a number of operations. The operations include receiving a signal from a keyboard that, similar to the keyboard described above, includes an arrangement of keys, plurality of proximity sensors and a second processor. The operations also include determining one or more commands or instructions for directing performance of one or more operations of the apparatus or software operating on the apparatus, where the command(s) or instruction(s) are determined as a function of the signal received from the keyboard. In this regard, the command(s) or instruction(s) may include command(s) or instruction(s) that effectuate a change in a graphical output presented by a display during operation of the software operating on the apparatus.

A signal may be received from the keyboard in at least a first instance and a second instance, where the signal in the first instance includes a trigger signal, and the signal in the second instance includes a gesture signal. In the first instance, the trigger signal is received in response to a user performing a predefined trigger gesture movement with respect to the keyboard. Also in the first instance, the processor is configured to perform or cause the apparatus to perform identification of the signal received from the keyboard as a trigger signal to thereby turn on gesture recognition and interpretation. And in these instances, the command(s) or instruction(s) may be determined in the second instance after interpreting the trigger signal in the first instance, where the processor is otherwise configured to ignore the gesture signal.

More particularly, for example, in the first instance, identifying a signal as a trigger signal may include identifying the signal as being representative of a determined position and/or movement of the user's hand/finger(s) corresponding to the predefined trigger gesture movement of the hand/finger(s). The predefined trigger gesture movement may include sliding the finger(s) from a corner of a back edge of the keyboard along the back edge so that the finger(s) cover a distance within a predefined range of distances along the back edge. As another example, the predefined trigger gesture movement may include resting the hand or one or more fingers over a side edge of the keyboard, with the hand or one or more fingers covering all or only half of the side edge of the keyboard. And as another example, the predefined trigger gesture movement may include resting the hand or one or more fingers over the side edge of the keyboard, with a thumb of the hand resting over a front edge of the keyboard.

According to other aspects of exemplary embodiments of the present invention, a computer-readable storage medium is provided. Exemplary embodiments of the present invention therefore provide a keyboard including proximity sensors, as well as an apparatus and computer-readable storage medium for directing operation of an apparatus or software operating on the apparatus via keyboard including proximity sensors. As indicated above, and explained below, exemplary embodiments of the present invention may solve problems identified by prior techniques and provide additional advantages.

BRIEF DESCRIPTION OF THE DRAWINGS

Figure 1:
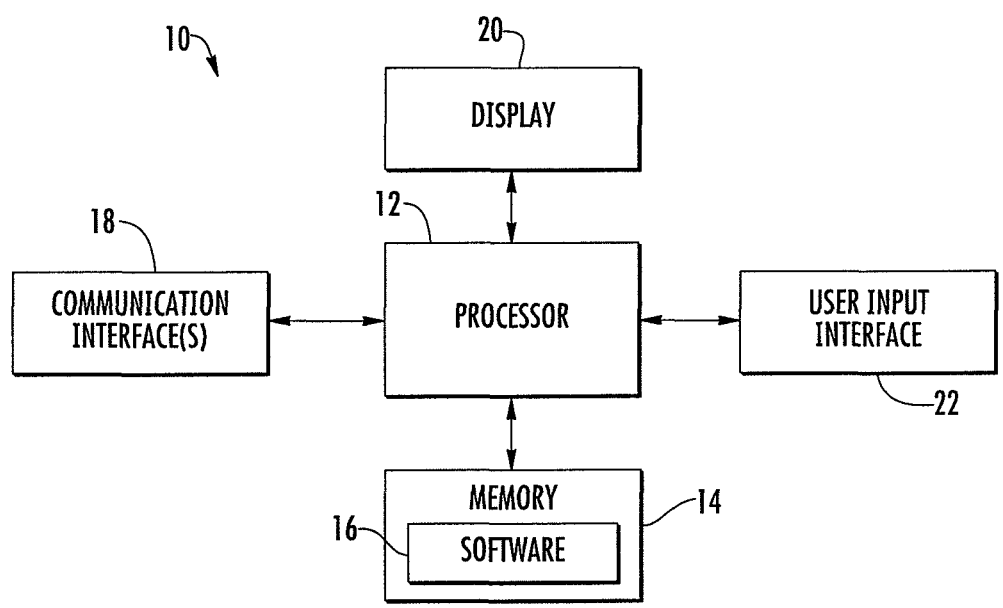
Figure 2:
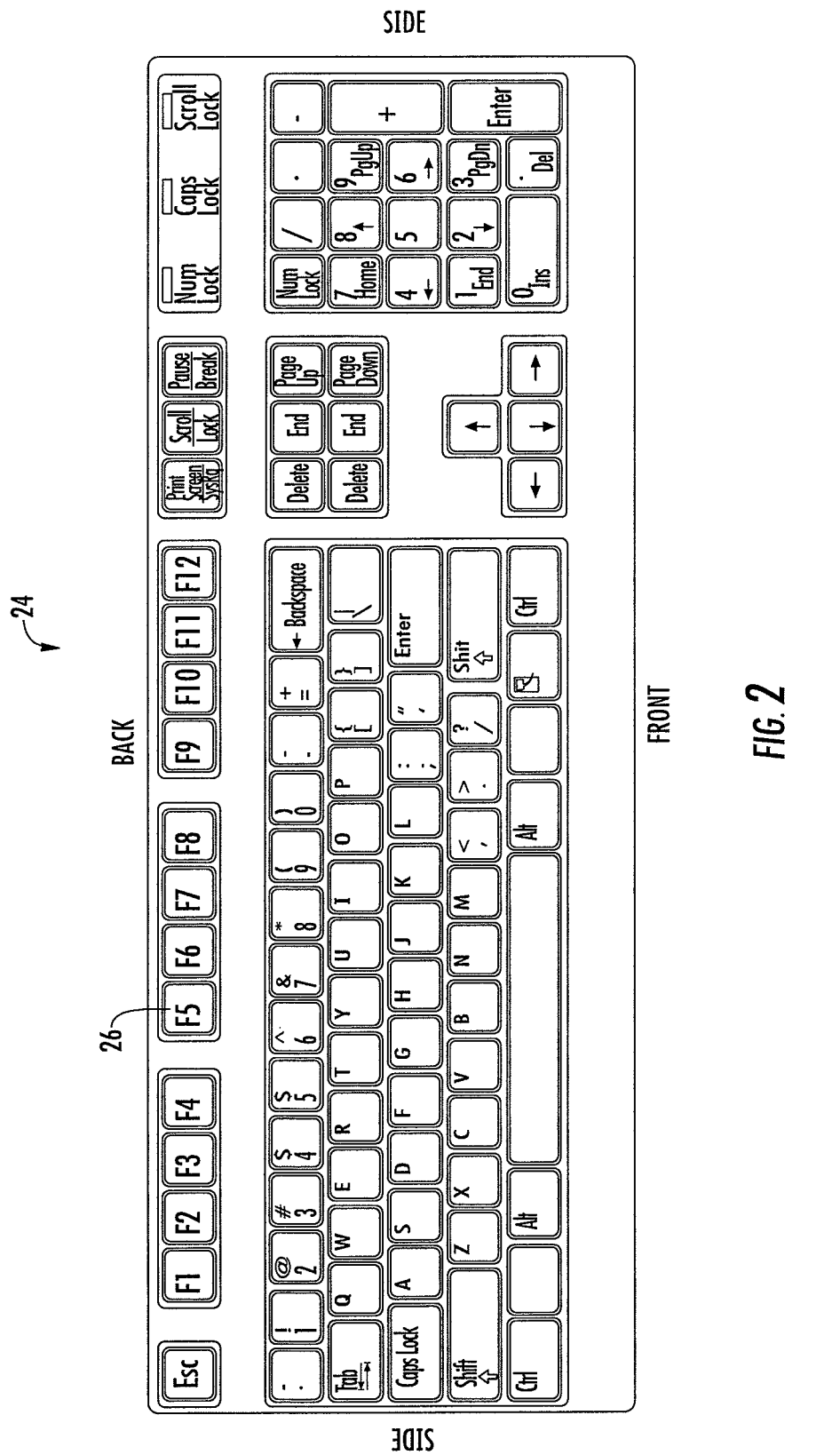
Figure 3:
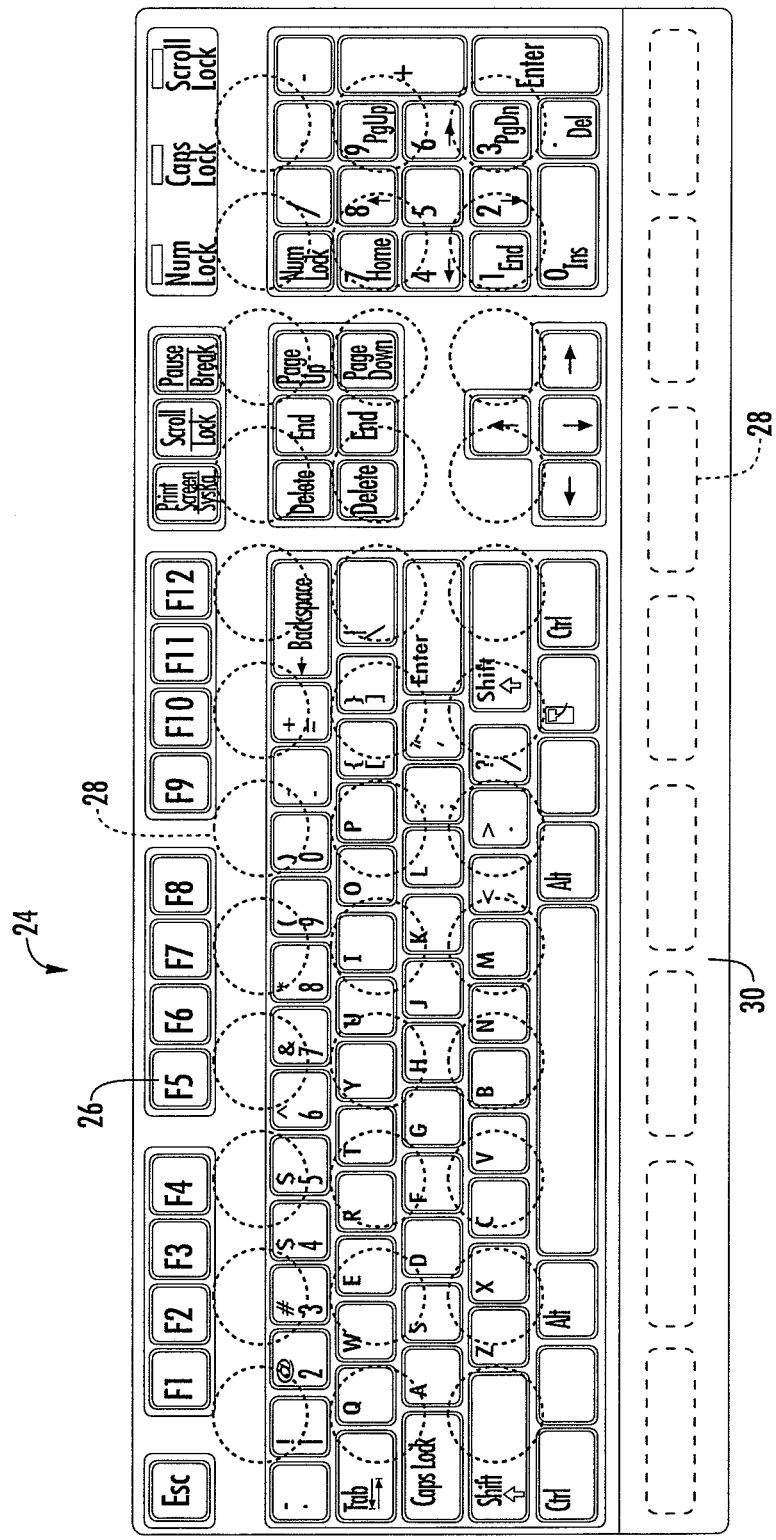
Figure 4:
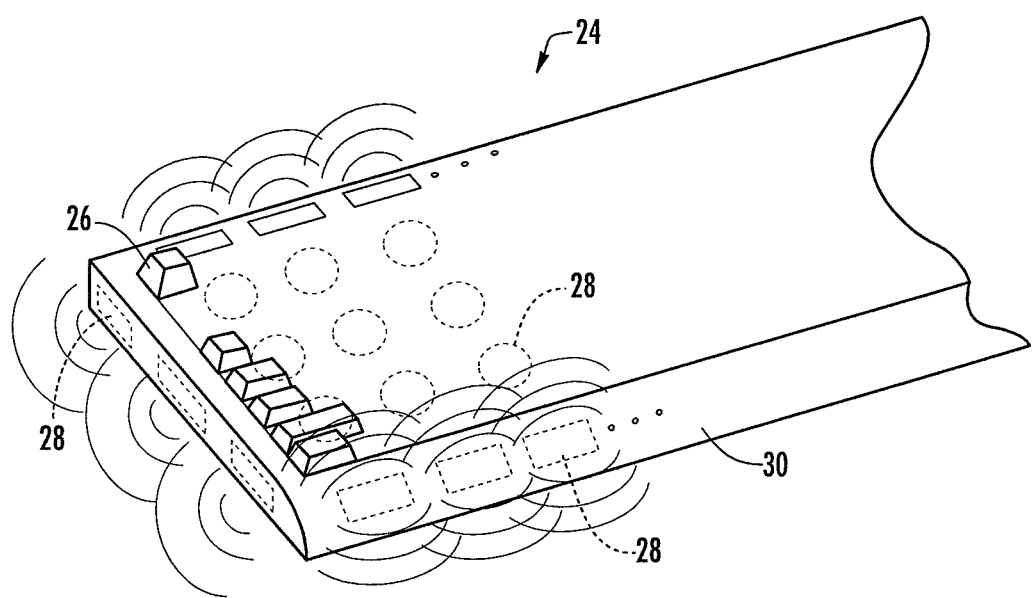
Figure 5:
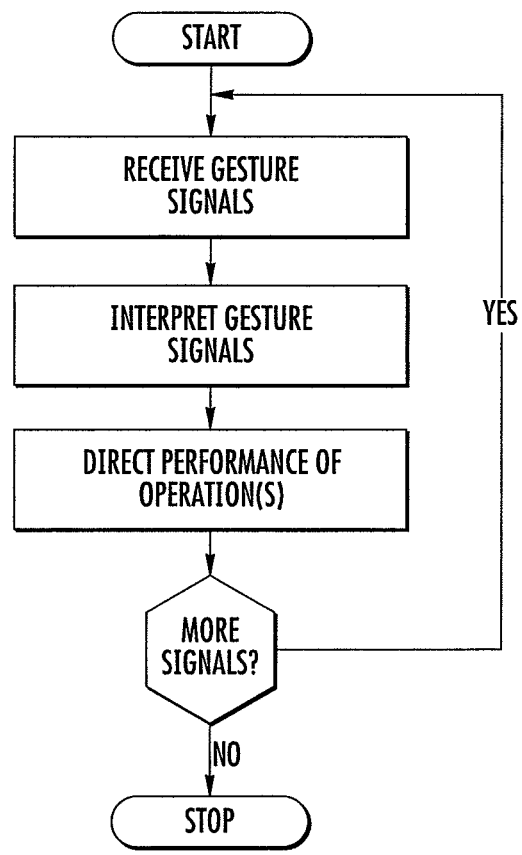
Figure 6:
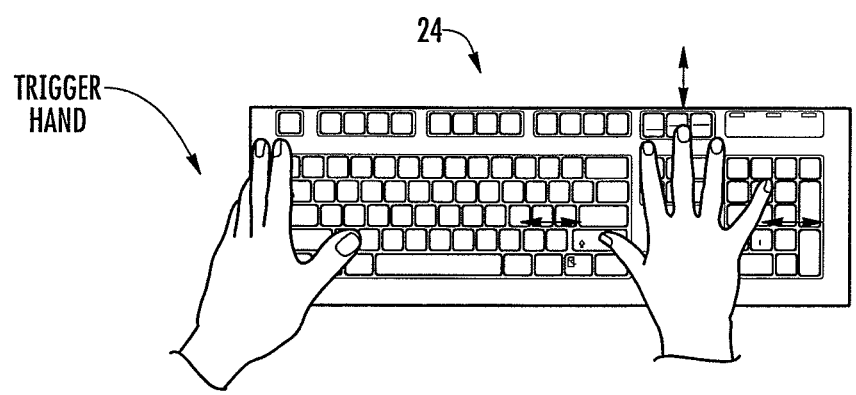

Having thus described the invention in general terms, reference will now be made to the accompanying drawings, which are not necessarily drawn to scale, and wherein:

FIG. 1 is a schematic block diagram of an apparatus configured to operate in accordance with embodiments of the present invention;

FIG. 2 is a schematic top view of a gesture-enabled keyboard, according to exemplary embodiments of the present invention;

FIG. 3 is a schematic top view of proximity sensors underneath a top surface of the gesture-enabled keyboard of FIG. 2, according to exemplary embodiments of the present invention;

FIG. 4 is a schematic perspective view of the gesture-enabled keyboard of FIG. 2 showing a number of the proximity sensors underneath the top surface, according to exemplary embodiments of the present invention;

FIG. 5 is a flowchart illustrating various steps in a method of receiving and interpreting gesture signals into gesture commands or other instructions, according to exemplary embodiments of the present invention;

FIG. 6 is a schematic top view of a trigger mechanism, according to exemplary embodiments of the present invention; and FIGS. 7-14 are schematic views of various example gesture movements and trigger mechanisms that may be employed according to exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, references may be made herein to directions and orientations including vertical, horizontal, diagonal, right, left, front, back and side; it should be understood, however, that any direction and orientation references are simply examples and that any particular direction or orientation may depend on the particular object, and/or the orientation of the particular object, with which the direction or orientation reference is made. Like numbers refer to like elements throughout.

Referring to FIG. 1, a block diagram of one type of apparatus configured according to exemplary embodiments of the present invention is provided ("exemplary" as used herein referring to "serving as an example, instance or illustration"). The apparatus and method of exemplary embodiments of the present invention will be primarily described in conjunction with medical-imaging applications, such as in the context of a PACS workstation. It should be understood, however, that the method and apparatus of embodiments of the present invention can be utilized in conjunction with a variety of other applications, both in the medical industry and outside of the medical industry. Further, the apparatus of exemplary embodiments of the present invention includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention.

Generally, the apparatus of exemplary embodiments of the present invention may comprise, include or be embodied in one or more fixed electronic devices, such as one or more of a laptop computer, desktop computer, workstation computer, server computer or the like. In a more particular example, the apparatus may comprise, include or be embodied in a picture archiving and communication system (PACS) or other medical-imaging system workstation. Additionally or alternatively, the apparatus may comprise, include or be embodied in one or more portable electronic devices, such as one or more of a tablet computer, mobile telephone, portable digital assistant (PDA) or the like.

As shown in FIG. 1, the apparatus 10 of one exemplary embodiment of the present invention may include a processor 12 connected to a memory 14. The memory can comprise volatile and/or non-volatile memory, and typically stores content, data or the like. In this regard, the memory may store content transmitted from, and/or received by, the apparatus. The processor and/or memory may be embodied in any of a number of different manners including, for example, one or more of any of the following: microprocessors, processors with or without accompanying digital signal processor(s), special-purpose integrated circuits, field-programmable gate arrays (FPGAs), controllers, application-specific integrated circuits (ASICs), computers or the like.

The memory 14 may also store one or more software applications 16, instructions or the like for the processor to perform steps associated with operation of the entity in accordance with exemplary embodiments of the present invention (although any one or more of these steps may be implemented in hardware alone or in any combination with software and/or firmware). This software may include, for example, a gesture-interpretation engine configured to receive gesture signal(s) and interpret those signal(s) to direct performance of one or more functions of the apparatus. In addition, the software may include software applications (e.g., medical-imaging software, Internet browser, etc.), one or more operations of which may be directed by the gesture-interpretation engine (and, hence, the user of the apparatus via interaction with a gesture-enabled keyboard).

In addition to the memory 14, the processor 12 may also be connected to at least one interface or other means for displaying, transmitting and/or receiving data, content or the like. In this regard, the interface(s) may include at least one communication interface 18 or other means for transmitting and/or receiving data, content or the like, such as to and/or from other device(s) and/or network(s) coupled to the apparatus. In addition to the communication interface(s), the interface(s) may also include at least one user interface that may include one or more wireline and/or wireless (e.g., Bluetooth) earphones and/or speakers, one or more displays 20, and/or a user input interface 22. The user input interface, in turn, may comprise any of a number of wireline and/or wireless devices allowing the entity to receive data from a user, such as a microphone, an image or video capture device, a keyboard or keypad, a joystick, or other input device.

As shown in FIG. 2, according to a more particular exemplary embodiment, the user input interface 22 may include a gesture-enabled keyboard 24. Similar to a conventional keyboard, the gesture-enabled keyboard includes an arrangement of buttons or keys 26 (key generally referring to a button or key), and may include a processor (and memory) and circuitry configured to interpret keystrokes on the keyboard. The processor and memory may be embodied in any of a number of different manners, including any of those described above. The keys of the keyboard may be depressed by a user to produce letters, numbers of symbols for input into a software application operating on the apparatus, and/or that may be depressed to effectuate functions of the apparatus or a software application operating on the apparatus. Although described herein as a keyboard, the gesture-enabled keyboard of exemplary embodiments of the present invention may additionally or alternatively include a keypad or other similar arrangement of keys or buttons.

Generally, the circuitry of the gesture-enabled keyboard 24 forms a grid of circuits underneath the keys 26 to form a key matrix. The circuits are configured to generate signals in response to the user depressing keys of the keyboard. For example, the circuits may be broken underneath the keys such that, when a user depresses one or more keys, the circuit(s) underneath the respective key(s) is completed; thereby generating signal(s) (e.g., current(s)). The processor receives the signal(s) from the respective circuit(s), and compares the location(s) of the circuit(s) to a character map (lookup table) in its memory to determine how to interpret the keystroke(s). As will be appreciated, although the keyboard may include mechanical-type switches that operate as above, the keyboard may alternatively employ non-mechanical switching techniques based on resistive or capacitive techniques.

As shown in FIGS. 3 and 4, in accordance with exemplary embodiments of the present invention, the circuitry of the gesture-enabled keyboard 24 further includes a plurality of proximity sensors 28 and associated circuitry. The associated circuitry may include a processor and/or memory, which may be embodied in any of a number of different manners, including any of those described above. An example of a suitable proximity sensor includes capacitive proximity sensors such as those implementing projected capacitance techniques, although other similar proximity sensors may be employed. And suitable sensors and associated circuitry includes, for example, the GestIC® technology developed by IDENT Technology AG of Germany.

The proximity sensors 28 may be situated in any of a number of different relationships relative to keys 26 of the keyboard 24, and may comprise any of a number of different types of known sensors configured to measure proximity of an object to the respective sensors and produce corresponding signals as a function of the measured proximity. For example, the proximity sensors may overlay or lie underneath the keys of the keyboard, or the proximity sensors may be integrated within the respective keys. Additionally, proximity sensors may overlay or lie underneath outer edges and/or a rest pad 30 of the keyboard.

In one example embodiment, the proximity sensors 28 may include a grid of sensors underneath keys 26 of the keyboard 24 and configured such that their electric fields (e-fields or sensing fields) are directed through the keys and upward from a top surface the keyboard. In this example embodiment, the proximity sensors also include an additional number of sensors along side and back edges of the keyboard and configured such that their e-fields are directed outward from the sides and back of the keyboard, and may further include a number of sensors underneath the rest pad of the keyboard and configured such that their e-fields are directed upward and outward from the rest pad.

The proximity sensors 28 of the gesture-enabled keyboard 24 are configured to detect an object such as a user's hand proximate the respective sensors, and produce signals representative of the proximity of detected object to the respective sensors. The processor of the circuitry associated with the proximity sensors may be configured to receive and process the signals to determine the position and/or movement of the detected object relative to the proximity sensors (and hence, the keyboard), and to produce signal(s) representative of the determined position and/or movement, and possibly other related information such as velocity. These signal(s) (referred to herein as "gesture signals"), then, may be provided in addition to and independent of the interpretation of a keystroke determined by the processor of the keyboard.

In accordance with exemplary embodiments of the present invention, the gesture-enabled keyboard 24 may be configured to provide gesture signals and any keystroke interpretations to the device 10. Referring to FIG. 5, the gesture-interpretation engine (software 16) of the device may be configured to receive and interpret the respective gesture signals into gesture commands or other instructions for directing performance of one or more operations of the device, or more particularly in various instances, operations of other software operating on the device. At any instant in time, the sensors 28 and gesture-interpretation engine may be capable of detecting and interpreting gesture signals indicative of a single sensed point (single-sense) or multiple simultaneous sensed points (multi-sense). In various instances, execution of operations of the device may effectuate a change in a graphical output presented by the display 12 during operation of the other software.

The gesture-interpretation engine (software 16) may be configured to interpret the gesture signals and direct performance of one or more operations of the device 10 as a function of the respective signals. The gesture-interpretation engine may be configured to distinguish between movements of the user intended as gesture movements and other movements not intended as gesture movements, such as those made during interaction with keys 26 of the keyboard 24. For example, the gesture-interpretation engine may include a trigger mechanism to "turn on" gesture recognition and interpretation—the device otherwise ignoring gesture signals from the keyboard. The device may respond to the user employing the trigger mechanism before or concurrent with all gesture movements. Or in various instances, the device may respond to the trigger mechanism for various gesture movements that resemble other movements not intended as gesture movements, and may respond to other gesture movements without the trigger mechanism. The device and/or keyboard in these instances or more generally may provide feedback, such as aural and/or visual feedback (e.g., on the display 20 and/or by a visual indicator such as a light-emitting diode (LED) or the like), indicating that the keyboard is ready to receive—or is receiving—a gesture movement.

Examples of gesture movements that may more particularly benefit from use of a trigger mechanism include the circling of finger(s), wiping or stroking finger(s) front to back, waving finger(s) and/or hand side to side, and moving fingers and/or hand up and down towards and away from the top surface of keyboard. In another example, a user may move their fingers in multi-finger combinations, such as to effect a typical zoom/pan/rotate (e.g., scale/translate/rotate) finger and thumb combination on one hand where one moves their fingers toward or away from one another to zoom, move both over the surface to pan, or rotate the vector between the two to rotate. And in another example, a user may "flick" their fingers in a manner interpreted as a quick motion in one direction such as left to right, or front to back, or vise versa.

Examples of gesture movements that may not particularly benefit from use of a trigger mechanism (but for which a trigger mechanism may be required or otherwise implemented) include sliding finger(s) side to side along an edge (e.g., front edge) of the keyboard, and sliding finger(s) back and forward along an edge (e.g., side edge) of the keyboard (e.g., opposite side edge to the one configured for turning on gesture recognition and interpretation. And in another example, the user may slide their finger(s) side to side along the top surface of the keyboard, such as along the back top surface behind a row of function keys over sensors 28 whose e-fields are directed upward from the keyboard.

The trigger mechanism according to one example embodiment may include the user performing a trigger gesture movement, such as by resting the user's hand or finger(s) of the user's hand over a side edge of the keyboard 24 and possibly also resting a thumb or finger(s) over a front or back edge near the corners of the keyboard, as shown in FIG. 6. When the user rests their hand, thumb and/or finger(s) in this manner, the sensor(s) 28 along the respective edge(s) may produce appropriate signals processed by the processor of the sensor's associated circuitry into a trigger signal, which the device may identify as a trigger signal to turn on gesture recognition and interpretation. In such instances, the user may place one hand to indicate "turn on" the keyboard to receive a gesture movement—and hence direct the keyboard to produce a trigger signal; and the user may move their other hand above the keys (and the proximity sensors 28) to effect a gesture movement. Other trigger mechanisms may additionally or alternatively be employed, some of which may be particular for "turning on" particular gesture movements. Examples of other trigger mechanisms are described below.

The gesture-interpretation engine (software 16) of the device 10 may be configured to process (interpret and direct device operations as a function of) the gesture signals as the engine receives the respective information. Alternatively, however, the engine may be configured to store the information for later processing or analysis by the engine, device or other software of the device. Additionally or alternatively, the device may be configured to transmit the information over a network to one or more other devices, where the information may undergo processing and/or analysis.

The gesture-interpretation engine may be configured to process the gesture signals and any other of the information in any of a number of different manners. As indicated above, for example, the engine may be configured to process the gesture signals to identify one or more gesture movements of the user and direct performance of one or more operations of the device 10, or more particularly in various instances, operations of other software operating on the device, as a function of the respective gesture movement(s). In this regard, the device may store a mapping between a distinct set of gestures movements and respective functions of the apparatus 10 or software application. That is, the gesture-interpretation engine may detect one or more gesture movements as inputs, and in response thereto, direct respective operations of the apparatus or software application as outputs. The gesture movements may be implemented in any appropriate sequence, or in various instances, multiple gesture movements may be implemented simultaneously. In the context of a PACS workstation, for example, gesture movements may be associated with imaging operations such as pan within an image or other display, zoom within an image or other display, change an viewport layout, scroll through a series of images/displays, adjust an image/display window and level or the like. Other examples of possible operations with which gesture movements may be associated include open a currently-selected study, close a study or the like. Gesture movements that may be simultaneously-implementable include those for functions such as simultaneous zoom and scroll, zoom and pan, scroll and adjust window and level or the like.

More particular examples of various gesture movements and trigger mechanisms that may be employed along with the respective movements are provided below with reference to FIGS. 7-14. It should be understood, however, that the example gesture movements described herein need not be triggered by a trigger mechanism. It should also be understood that although example trigger mechanisms may be described as triggering respective, example gesture movements, the trigger mechanisms may be equally employed to trigger other gesture movements, in addition to or in lieu of the gesture movements with which the trigger mechanisms are described as triggering herein.

Figure 7A:
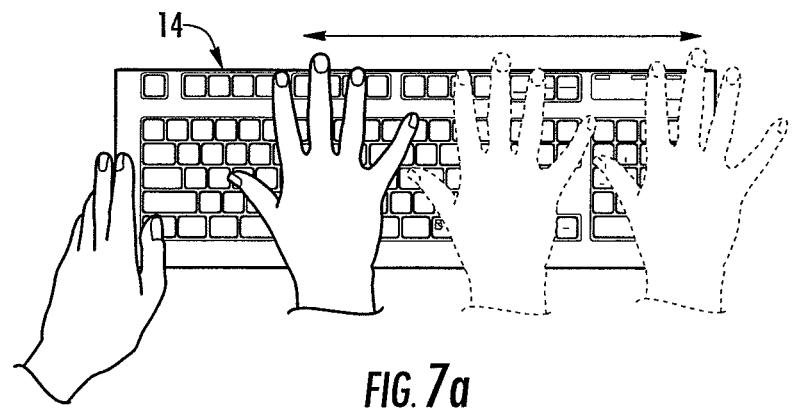
Figure 7B:
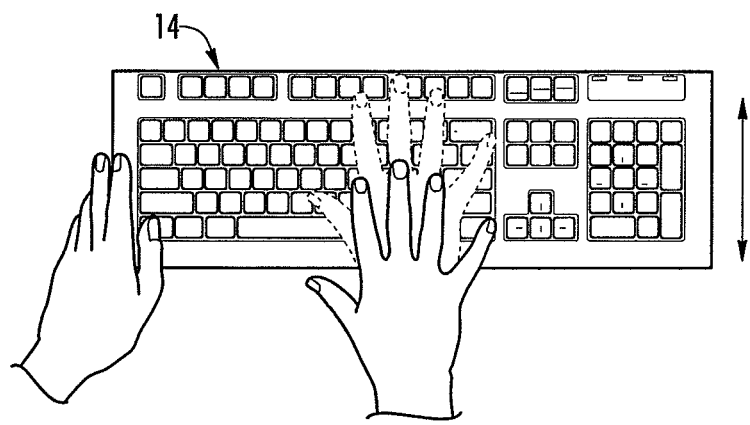
Figure 7C:
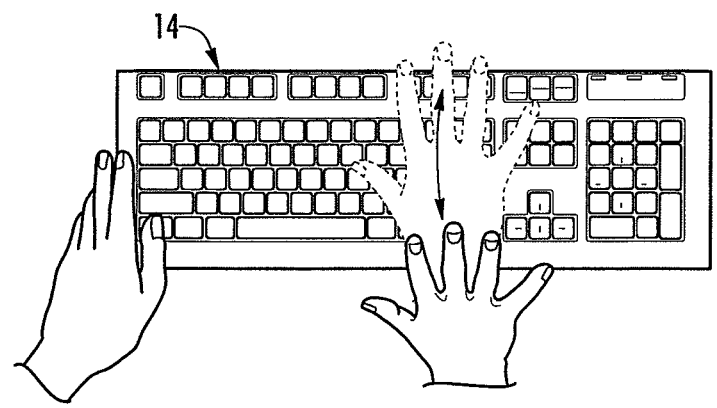
Figure 8A:
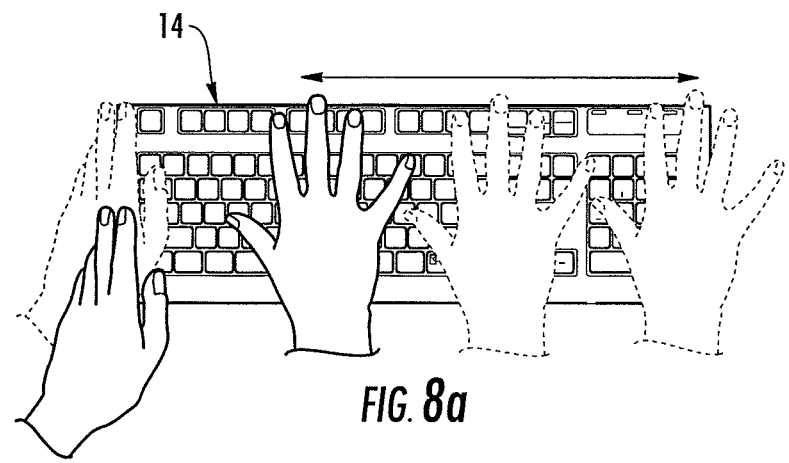
Figure 8B:
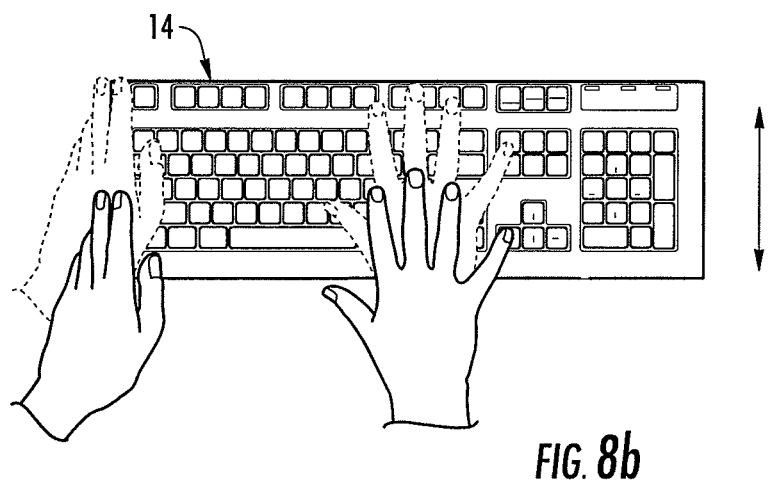
Figure 8C:
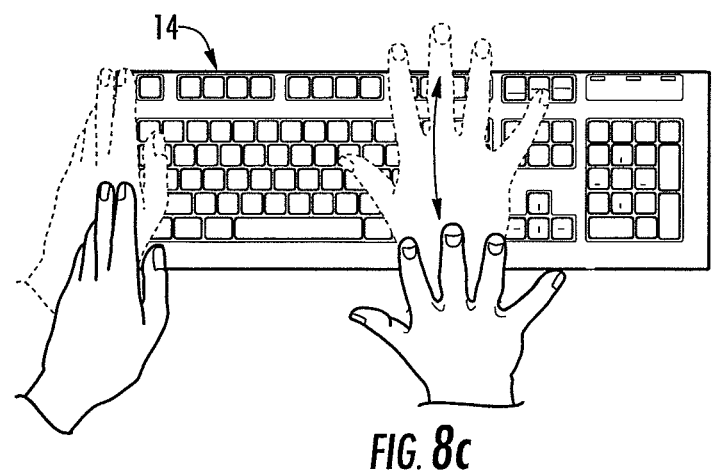
Figure 9:
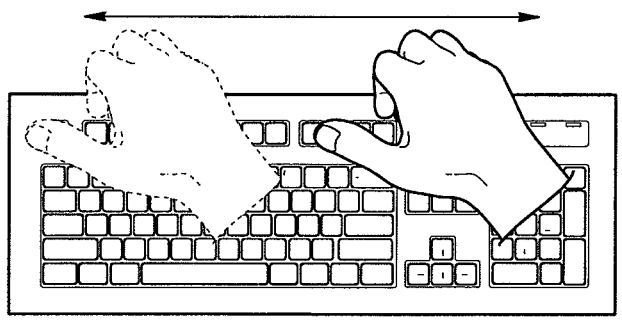

Referring now to FIGS. 7, 8 and 9, one example gesture movement may be employed to direct performance of zooming operations within software operating on the device 10. Referring more particularly to FIGS. 7a, 7b and 7c, this gesture movement may be triggered by a trigger mechanism in which the user holds one hand over a side edge of the keyboard 24 covering only a front half of the side edge. The user may then perform a gesture movement to zoom within software operating on the device.

As described herein, "half" of a length of the keyboard may be interpreted as the portion of the length underneath which half of the proximity sensors 28 along the length are disposed;

and similarly, "all" or the "whole" of the length may be interpreted as the portion of the length underneath which all of the proximity sensors along the length are disposed. Thus, for example, for a side edge having four proximity sensors disposed underneath, half of the side edge may be interpreted as the portion of the side edge underneath which two of the proximity sensors are disposed, and all of the side edge may be interpreted as the portion of the side edge underneath which all four of the proximity sensors are disposed.

In one example embodiment, this zooming gesture movement may include the user waving finger(s) on their other hand (or generally their other hand) from one side to the other side over the keyboard to zoom in, or waving their other hand/finger(s) from the other side to the one side over the keyboard to zoom out, as shown in FIG. 7a. In another example embodiment, a zooming gesture movement may include the user wiping or stroking finger(s) on their other hand from front to back over the keyboard to zoom in one direction (e.g., in/out), or wiping or stroking their finger(s) from back to front to zoom in the other direction (e.g., out/in), as shown in FIG. 7b. In yet another example embodiment, a zooming gesture movement may include the user raising finger(s) on their other hand (or generally their other hand) up away from the top of keyboard to zoom in one direction e.g., (in/out), or pushing their hand/finger(s) down towards the top of keyboard to zoom in the other direction (e.g., out/in), as shown in FIG. 7c.

In performing the zooming gesture movement, or more generally in performing any of a number of gesture movements, the user may clutch the hand effectuating the gesture movement or between gesture movements. In such instances, the user may bring their respective hand or its finger(s) off the top area of the keyboard 24 to avoid the sensors 28 detecting a constantly reversing direction. Alternatively, the gesture-interpretation engine may be configured to detect and remember (e.g., store an indication of) the starting direction of the gesture movement so the user need not remove their clutching hand/finger(s) from the top area of the keyboard. As another alternative, the user may remove their hand implementing the trigger mechanism from the keyboard to thereby "turn off" gesture recognition and interpretation.

Referring to FIGS. 8a, 8b and 8c, another example implementing a zooming gesture movement includes a trigger mechanism in which the user holds one hand over a side edge of the keyboard 24 covering only a front half of the side edge to enable zoom gesturing in one zoom direction (e.g., in/out). To enable zoom gesturing in the other zoom direction (e.g., out/in), then, the user may slide their same hand back along the respective edge such that their hand rests over all of the side edge. The gesture movements described above with respect to FIGS. 7a, 7b and 7c may then be performed without regard to direction of movement of the user's hand/finger(s) as placement of the user's trigger hand (hand performing the trigger gesture movement) controls the zoom direction (e.g., in/out).

Referring to FIG. 9, in yet a further example implementing a zooming gesture movement, a trigger mechanism may not be needed to turn on gesture recognition and interpretation. In this example, the user may slide finger(s) of one of their hands side-to-side along the back top surface of the keyboard 24, such as behind a row of function keys on the keyboard (shown in FIG. 2, for example, as keys identified by "F" and a digit—e.g., F1, F2, etc.). The user may slide their finger(s) in one direction to zoom in, and in another direction to zoom out. Also in this example, the sensors 28 disposed underneath this area of the keyboard may be set to project their e-fields only far enough to sense through the keyboard case and not far into the air space above (e.g., one or two millimeters) such that the user has to run their finger(s) along the surface for detection, thereby avoiding false activations.

Figure 10A:
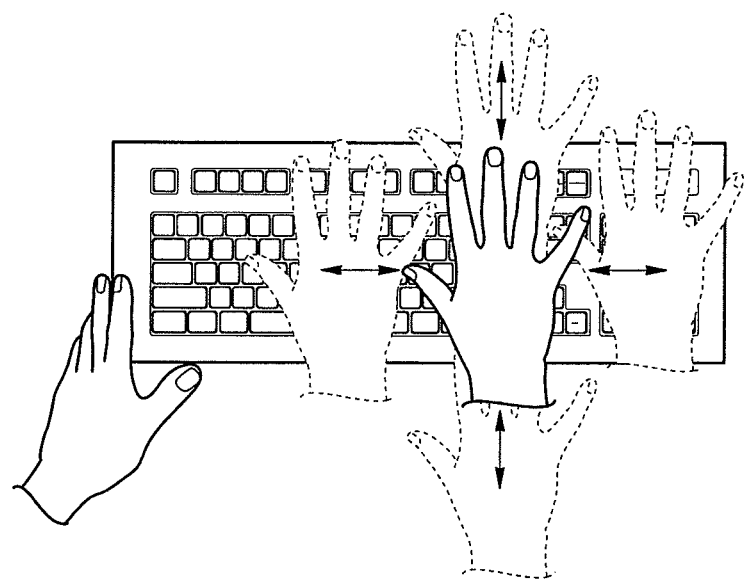
Figure 10B:
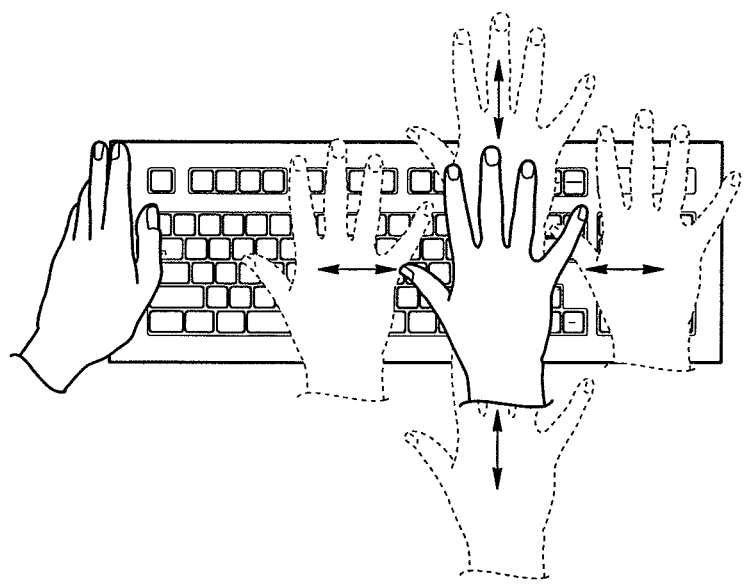

FIG. 10 illustrates another example gesture movement may be employed to direct performance of panning operations within software operating on the device 10. This gesture movement may be triggered by a trigger mechanism in which the user holds one hand over a side edge of the keyboard 24 covering only a front half of the side edge, and lowers their thumb of that hand to the front edge of the keyboard, as shown in FIG. 10a. In another example shown in FIG. 10b, the panning gesture movement may be triggered by a trigger mechanism in which the user slides one of their hands to cover the whole of a side edge of the keyboard (covering multiple sensors 28). In either instance, however, the user may then move finger(s) on their other hand (or generally their other hand) over the keyboard surface in any X and/or Y direction to pan an image or other display of the software.

Figure 11A:
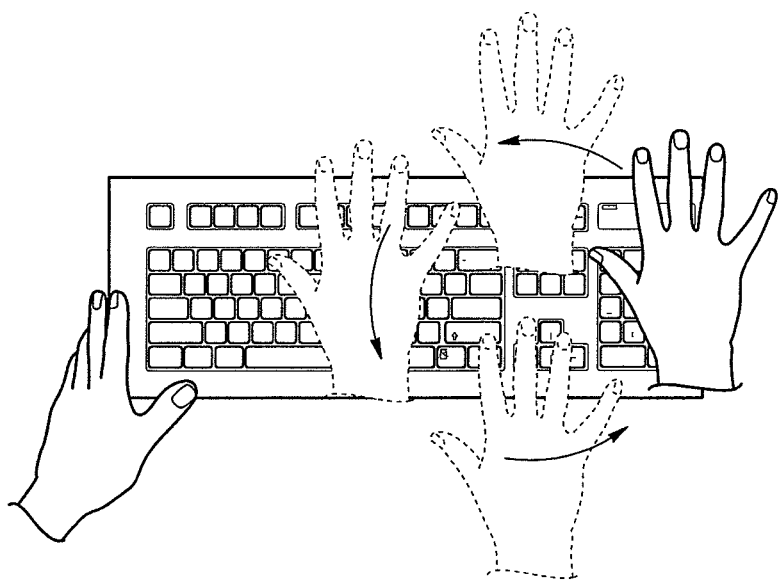
Figure 11B:
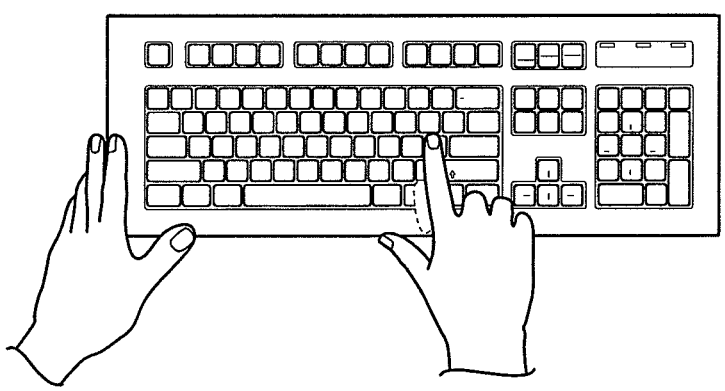

FIG. 11 illustrates another example gesture movement may be employed to direct performance of rotating operations within software operating on the device 10 (causing rotation of an image or other display of the software). This gesture movement may be triggered by any of the aforementioned trigger mechanisms. Regardless of the trigger mechanism (or even whether one is required), the user may circle finger(s) on their non-trigger hand in one direction over the top surface of the keyboard 24 to rotate the image/display in one direction, or circle finger(s) in the other direction to rotate the image/display in the other direction, as shown in FIG. 11a. In another example, the user may quickly flick finger(s) on their non-trigger hand over the top surface of the keyboard toward the front or back of the keyboard to rotate the image/display in ninety-degree increments, as shown in FIG. 11b. In this regard, the user flicking their finger(s) front-to-back may rotate the image/display in one direction, and flicking back-to-front may rotate the image/display in the other direction.

Figure 12:
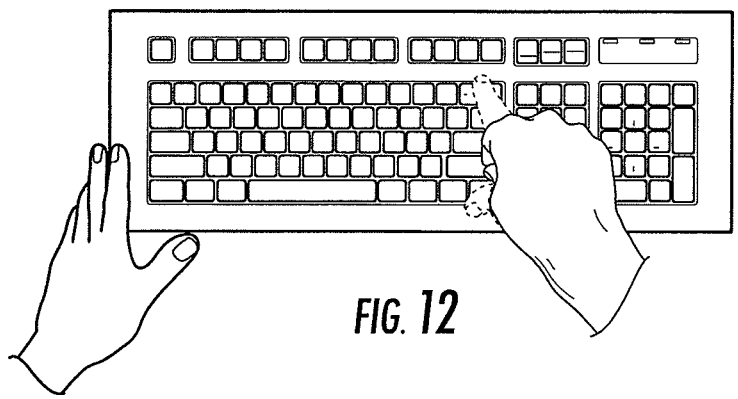

In various instances, the device 10 may be capable of implementing any combination of the zooming, panning or rotating operations in response to an appropriate combination gesture movement, as shown in FIG. 12. In these instances, the respective gesture movement may be triggered by a trigger mechanism such as one of the mechanisms described above. The user may then implement a multi-sense type gesture movement in which the user pinches a finger and thumb on one hand together or moves their finger and thumb apart to zoom an image/display (in/out), moves both their finger and thumb over the top surface of the keyboard 24 to pan within the image/display, and/or rotates a vector between their finger and thumb to rotate the image/display.

Figure 13A:
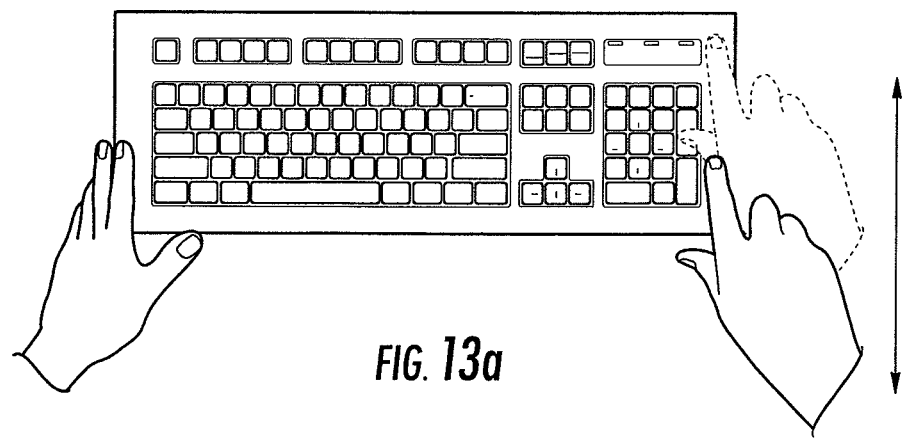
Figure 13B:
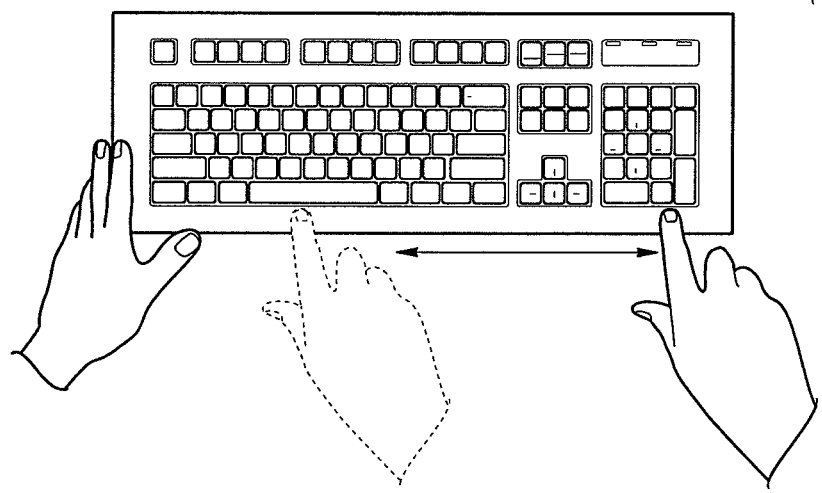
Figure 13C:
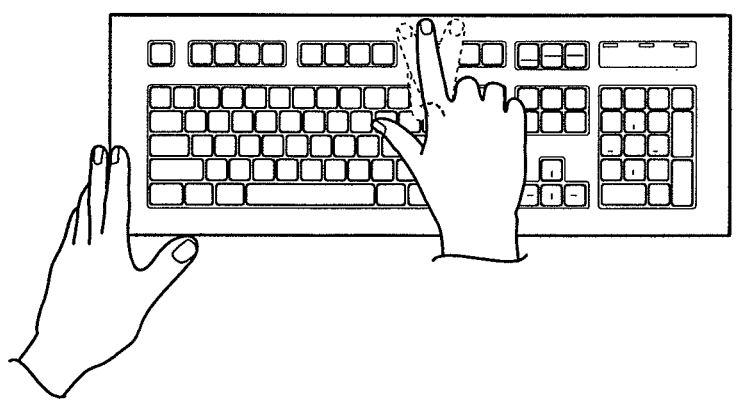

FIG. 13 illustrates yet another example gesture movement may be employed to direct performance of scrolling operations within software operating on the device 10 (scrolling through a series of images/displays of the software). Similar to before, this gesture movement may be triggered by a trigger mechanism such as one of the mechanisms described above. The user may then move finger(s) on their other hand (or generally their other hand) front-to-back or back-to-front along a side edge of the keyboard 24 (if implemented, the side other than that on which the trigger mechanism is being implemented), as shown in FIG. 13a. In another example, the user may similarly move their finger(s) side-to-side along the front edge of the keyboard, as shown in FIG. 13b. The user sliding their fingers in one direction scrolls through a series in one direction, and sliding their fingers in the other direction scrolls through the series in the other direction. In yet another example implementing a scrolling gesture movement, the user may quickly flick finger(s) on their other hand over the keyboard toward one side or the other to scroll through a series, as shown in FIG. 13c. Flicking left-to-right may scroll the series in one direction, and flicking right-to-left may scroll the series in the other direction.

Figure 14A:
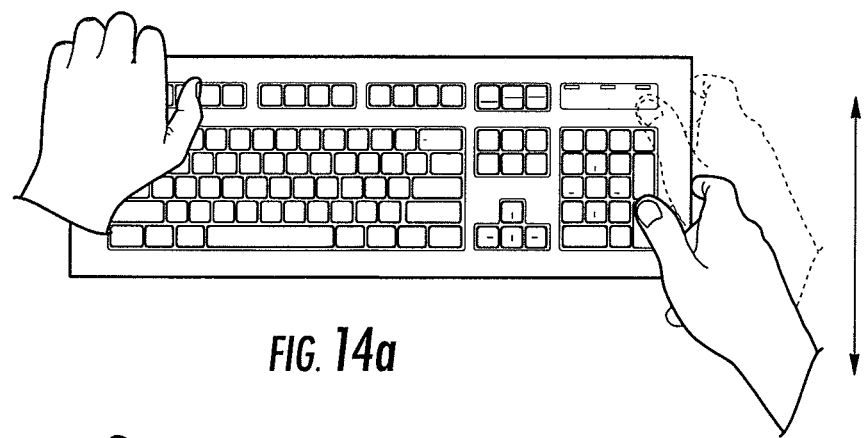
Figure 14B:
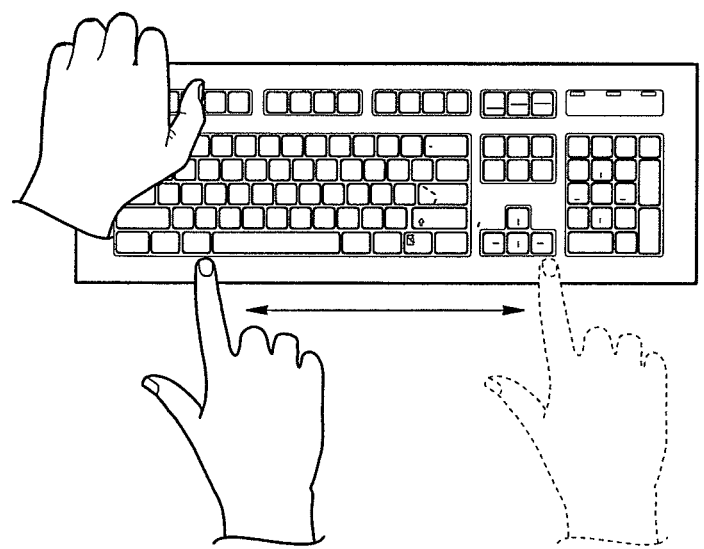

FIG. 14 illustrates an additional example gesture movement may be employed to direct performance of window/level adjustment operations within software operating on the device 10 (adjusting an image/display window and level). This gesture movement may be triggered by a trigger mechanism in which the user slides finger(s) on one hand from a corner of the back edge along the back edge of the keyboard 24 so that their fingers cover a distance within a predefined range of distances (e.g., a distance considered short) along the back edge of the keyboard from the respective corner. The user may then slide their finger(s) side-to-side in front of or near the front edge of the keyboard, whereby sliding their finger(s) in one direction adjusts the window of an image/display in one direction, and sliding their finger(s) in the other direction adjusts the window in the other direction, as shown in FIG. 14a. Similarly, the user may slide finger(s) on their other hand (or generally their other hand) front-to-back or back-to-front along the other side edge of the keyboard, whereby sliding their finger(s) in one direction adjusts the level of an image/display in one direction, and sliding their finger(s) in the other direction adjusts the level in the other direction, as shown in FIG. 14b.

Figure 14C:
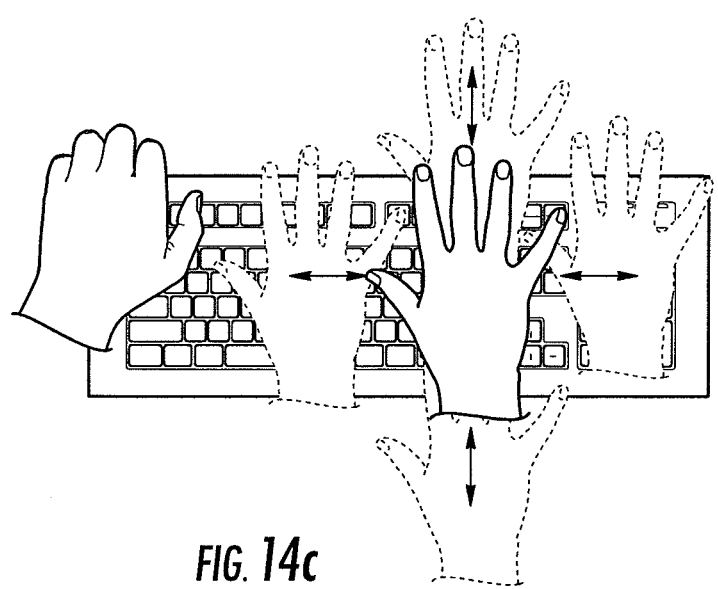

In a further example implementing a window/level adjustment gesture movement, the user may move finger(s) on their other hand (or generally their other hand) over the top surface of the keyboard in any X and/or Y direction to adjust the window and/or level, as shown in FIG. 14c. In this regard, the user moving their finger(s)/hand in the X direction may adjust one of the window or level of an image/display, and moving their finger(s)/hand in the Y direction may adjust the other of the window or level of the image/display. And movement of the user's finger(s)/hand in both the X and Y directions may simultaneously adjust both the window and level of the image/display.

As explained herein, the device 10 and the gesture-enabled keyboard 24 may each include a processor (e.g., processor 12) and/or circuitry (which may include a processor) configured to perform one or more functions. It should be understood that one or more of the functions of the processor of the device may instead be performed by the processor and/or circuitry of the gesture-enabled keyboard. Likewise, one or more of the functions of the processor and/or circuitry of the gesture-enabled keyboard may instead be performed by the processor of the device. And even further, one or more of the functions of the processor and/or circuitry of either or both of the device or gesture-enabled keyboard may be performed by yet another device, which may be directly or indirectly coupled to the device or gesture-enabled keyboard, such as via one or more network(s).

According to one aspect of the present invention, all or a portion of an apparatus (e.g., device 10, gesture-enabled keyboard 24) generally operates under control of a computer program. The computer program for performing the methods of exemplary embodiments of the present invention may include one or more computer-readable program code portions, such as a series of computer instructions, embodied or otherwise stored in a non-transitory computer-readable storage medium, such as the non-volatile storage medium.

It will be understood that each step of a method according to exemplary embodiments of the present invention, and combinations of steps in the method, may be implemented by computer program instructions. These computer program instructions may be loaded onto a computer or other programmable apparatus to produce a machine, such that the instructions which execute on the computer or other programmable apparatus create means for implementing the functions specified in the step(s) of the method. These computer program instructions may also be stored in a computer-readable memory that can direct a computer or other programmable apparatus to function in a particular manner, such that the instructions stored in the computer-readable memory produce an article of manufacture including instruction means which implement steps of the method. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing steps of the method.

Accordingly, exemplary embodiments of the present invention support combinations of means for performing the specified functions, combinations of steps for performing the specified functions and program instruction means for performing the specified functions. It will also be understood that each step or function, and combinations of steps or functions, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A keyboard comprising:
   an arrangement of keys;
   circuitry forming a grid of circuits underneath respective keys of the arrangement of keys, a circuit of the grid of circuits being configured to generate a signal in response to a keystroke in which a respective key of the arrangement of keys is depressed;
   a first processor configured to receive the signal from the circuit of the grid of circuits, and compare a location of the respective circuit to a character map to determine how to interpret the keystroke;
   a plurality of proximity sensors forming a grid of sensors underneath the keys, the proximity sensors being configured to measure a proximity of an object to the respective proximity sensors, and produce a signal representative of the measured proximity; and
   a second processor configured to receive the signal representative of the measured proximity, determine at least one of a position or movement of the object relative to the proximity sensors based on the respective signal, and produce a gesture signal representative of the determined at least one of position or movement, the gesture signal being interpretable into one or more commands or instructions for directing performance of one or more operations of an apparatus or software operating on the apparatus.

2. The keyboard of claim 1, wherein the plurality of proximity sensors include a first plurality of proximity sensors configured to project respective electric fields through the keys and upward from a top surface of the keyboard.

3. The keyboard of claim 2, wherein the plurality of proximity sensors also include a second plurality of proximity sensors configured to project respective electric fields outward from sides of the keyboard.

4. The keyboard of claim 2, wherein the plurality of proximity sensors also include a second plurality of proximity sensors configured to project respective electric fields outward from a back of the keyboard.

5. The keyboard of claim 2 further comprising a rest pad extending from a front of the keyboard, wherein the plurality of proximity sensors also include a second plurality of proximity sensors underneath the rest pad, the second plurality of proximity sensors being configured to project respective electric fields upward and outward from the rest pad.

6. An apparatus comprising a processor configured to at least perform or cause the apparatus to at least perform the following:
receiving a signal from a keyboard, the keyboard comprising:
an arrangement of keys;
a plurality of proximity sensors forming a grid of sensors underneath the keys, the proximity sensors being configured to measure a proximity of an object to the respective proximity sensors, and produce a signal representative of the measured proximity; and
a second processor configured to receive the signal representative of the measured proximity, determine at least one of a position or movement of the object relative to the proximity sensors based on the respective signal, and produce a signal representative of the determined at least one of position or movement, the signal received from the keyboard including the signal representative of the determined at least one of position or movement; and
determining one or more commands or instructions for directing performance of one or more operations of the apparatus or software operating on the apparatus, the one or more commands or instructions being determined as a function of the signal received from the keyboard.

7. The apparatus of claim 6, wherein determining one or more commands or instructions includes determining one or more commands or instructions that effectuate a change in a graphical output presented by a display during operation of the software operating on the apparatus.

8. The apparatus of claim 6, wherein receiving a signal from a keyboard comprises receiving a signal from a keyboard in at least two instances, the signal in the first instance comprising a trigger signal, and the signal in the second instance comprising a gesture signal,
wherein in the first instance, the trigger signal is received in response to a user performing a predefined trigger gesture movement with respect to the keyboard,
wherein the processor is configured to perform or cause the apparatus to perform, in the first instance, identifying the signal received from the keyboard as a trigger signal to thereby turn on gesture recognition and interpretation, and
wherein determining one or more commands or instructions occurs in the second instance after interpreting the trigger signal in the first instance, the processor otherwise being configured to ignore the gesture signal.

9. The apparatus of claim 8, wherein the object comprises a hand or one or more fingers of a hand of the user, and wherein in the first instance identifying the signal as a trigger signal comprises identifying the signal as being representative of a determined at least one of position or movement of the hand or one or more fingers corresponding to the predefined trigger gesture movement of the hand or one or more fingers.

10. The apparatus of claim 9, wherein the predefined trigger gesture movement comprises sliding the one or more fingers from a corner of a back edge of the keyboard along the back edge so that the one or more fingers cover a distance within a predefined range of distances along the back edge.

11. The apparatus of claim 9, wherein the predefined trigger gesture movement comprises resting the hand or one or more fingers over a side edge of the keyboard, with the hand or one or more fingers covering all or only half of the side edge of the keyboard.

12. The apparatus of claim 11, wherein the predefined trigger gesture movement comprises resting the hand or one or more fingers over the side edge of the keyboard, with a thumb of the hand resting over a front edge of the keyboard.

13. A non-transitory computer-readable storage medium having computer-readable program code portions stored therein, the computer-readable program portions being configured to direct a processor to at least perform or cause an apparatus to at least perform the following:
receiving a signal from a keyboard, the keyboard comprising:
an arrangement of keys;
a plurality of proximity sensors forming a grid of sensors underneath the keys, the proximity sensors being configured to measure a proximity of an object to the respective proximity sensors, and produce a signal representative of the measured proximity; and
a processor configured to receive the signal representative of the measured proximity, determine at least one of a position or movement of the object relative to the proximity sensors based on the respective signal, and produce a signal representative of the determined at least one of position or movement, the signal received from the keyboard including the signal representative of the determined at least one of position or movement; and
determining one or more commands or instructions for directing performance of one or more operations of the apparatus or software operating on the apparatus, the one or more commands or instructions being determined as a function of the signal received from the keyboard.

14. The computer-readable storage medium of claim 13, wherein determining one or more commands or instructions includes determining one or more commands or instructions that effectuate a change in a graphical output presented by a display during operation of the software operating on the apparatus.

15. The computer-readable storage medium of claim 13, wherein receiving a signal from a keyboard comprises receiving a signal from a keyboard in at least two instances, the signal in the first instance comprising a trigger signal, and the signal in the second instance comprising a gesture signal,
wherein in the first instance, the trigger signal is received in response to a user performing a predefined trigger gesture movement with respect to the keyboard,
wherein the computer-readable program portions are further configured to direct the processor to perform or cause the apparatus to perform, in the first instance, identifying the signal received from the keyboard as a trigger signal to thereby turn on gesture recognition and interpretation, and
wherein determining one or more commands or instructions occurs in the second instance after interpreting the trigger signal in the first instance, the processor otherwise being configured to ignore the gesture signal.

16. The computer-readable storage medium of claim 15, wherein the object comprises a hand or one or more fingers of a hand of the user, and wherein in the first instance identifying the signal as a trigger signal comprises identifying the signal as being representative of a determined at least one of position or movement of the hand or one or more fingers corresponding to the predefined trigger gesture movement of the hand or one or more fingers.

17. The computer-readable storage medium of claim 16, wherein the predefined trigger gesture movement comprises sliding the one or more fingers from a corner of a back edge of the keyboard along the back edge so that the one or more fingers cover a distance within a predefined range of distances along the back edge.

18. The computer-readable storage medium of claim 16, wherein the predefined trigger gesture movement comprises resting the hand or one or more fingers over a side edge of the keyboard, with the hand or one or more fingers covering all or only half of the side edge of the keyboard.

19. The computer-readable storage medium of claim 18, wherein the predefined trigger gesture movement comprises resting the hand or one or more fingers over the side edge of the keyboard, with a thumb of the hand resting over a front edge of the keyboard.

\* \* \* \* \*

UNITED STATES PATENT AND TRADEMARK OFFICE
CERTIFICATE OF CORRECTION

PATENT NO. : 8,432,301 B2
APPLICATION NO. : 12/853958
DATED : April 30, 2013
INVENTOR(S) : Edwards It is certified that error appears in the above-identified patent and that said Letters Patent is hereby corrected as shown below:

On the Title page,
(73) Assignee: "(BE)" should read --(BM)--.

Signed and Sealed this
Third Day of September, 2013

Teresa Stanek Rea
*Acting Director of the United States Patent and Trademark Office*